C. W. GILL.
PLASTIC BLOCK MAKING APPARATUS.
APPLICATION FILED JULY 7, 1909.

1,077,523.

Patented Nov. 4, 1913.
7 SHEETS—SHEET 1.

C. W. GILL.
PLASTIC BLOCK MAKING APPARATUS.
APPLICATION FILED JULY 7, 1909.

1,077,523. Patented Nov. 4, 1913.
7 SHEETS—SHEET 3.

C. W. GILL.
PLASTIC BLOCK MAKING APPARATUS.
APPLICATION FILED JULY 7, 1909.

1,077,523.

Patented Nov. 4, 1913.

7 SHEETS—SHEET 4.

C. W. GILL.
PLASTIC BLOCK MAKING APPARATUS.
APPLICATION FILED JULY 7, 1909.
1,077,523.
Patented Nov. 4, 1913.
7 SHEETS—SHEET 5.
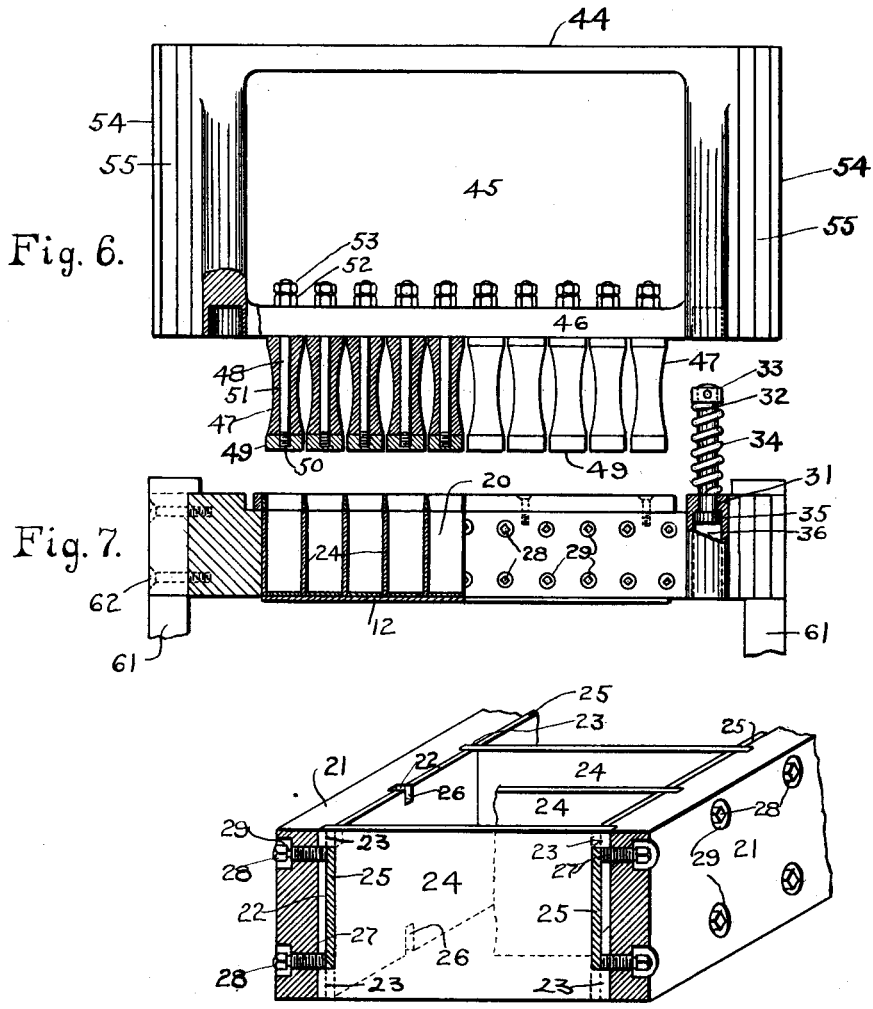

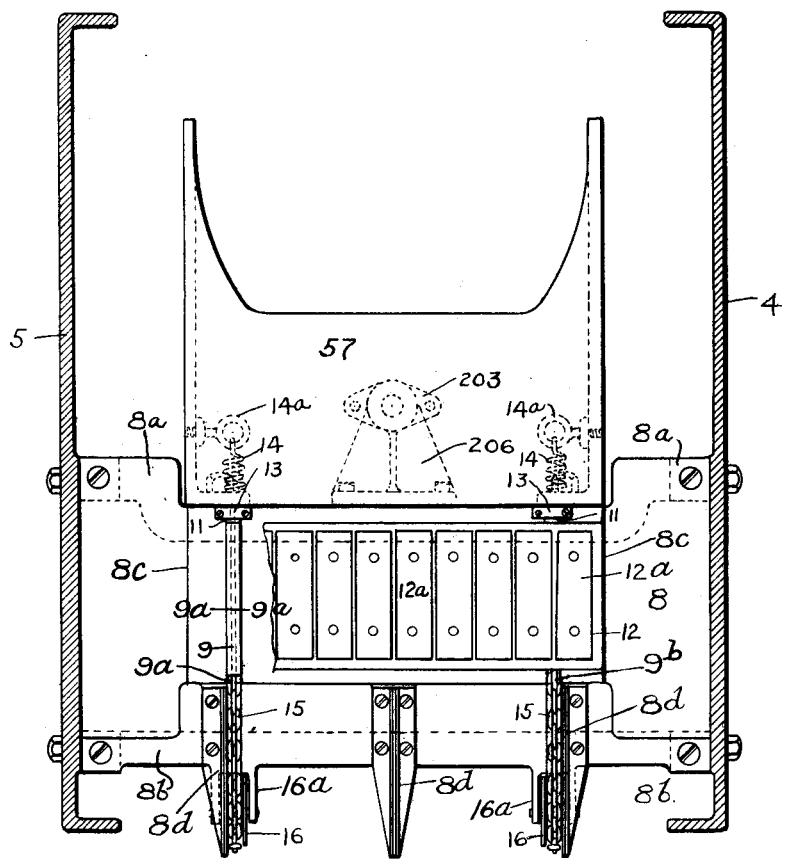
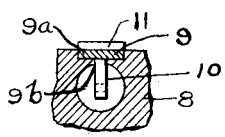

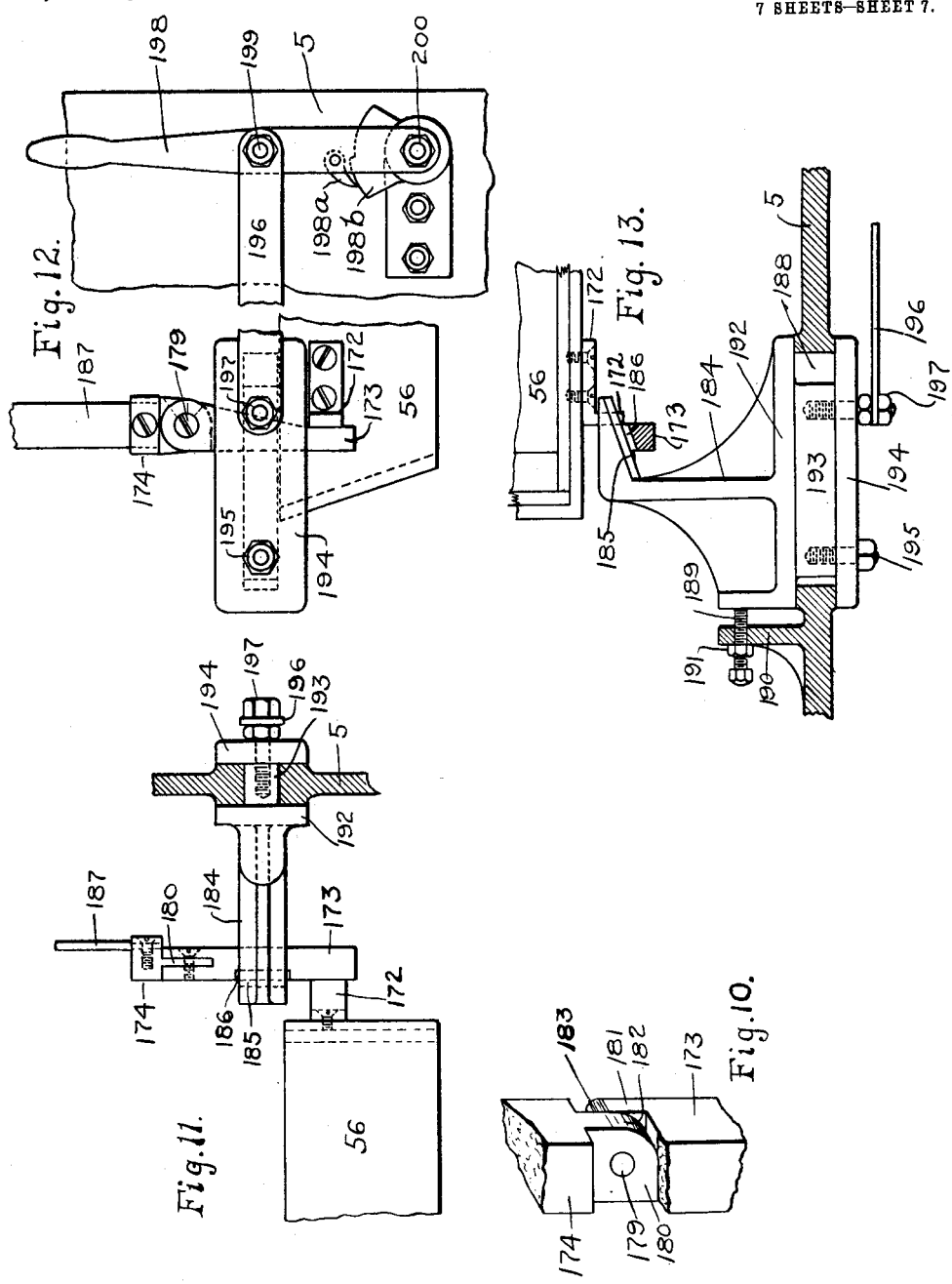

UNITED STATES PATENT OFFICE.

CHARLES W. GILL, OF ERIE, PENNSYLVANIA, ASSIGNOR TO THE GILL BRICK MACHINE COMPANY, OF WESTFIELD, NEW YORK, A CORPORATION OF ARIZONA.

PLASTIC-BLOCK-MAKING APPARATUS.

1,077,523.  Specification of Letters Patent.  Patented Nov. 4, 1913.

Application filed July 7, 1909. Serial No. 506,392.

*To all whom it may concern:*

Be it known that I, CHARLES W. GILL, a citizen of the United States, residing at Erie, county of Erie, and State of Pennsylvania, have invented new and useful Improvements in Plastic-Block-Making Apparatus, of which the following is a specification.

This invention relates to plastic block making apparatus, and consists in certain improvements in the construction thereof as will be hereinafter described and pointed out in the claims.

More particularly, the apparatus is designed with reference to the manufacture of cement brick,—that is brick using Portland cement and sand as the material of which it is formed.

In carrying out this invention, some of the operations are automatic, and some are manual. It has been found in practice that it is not desirable to have all of the movements automatic, because of the inability of the operators in removing the material to do their part in a fixed time.

Figure 1:
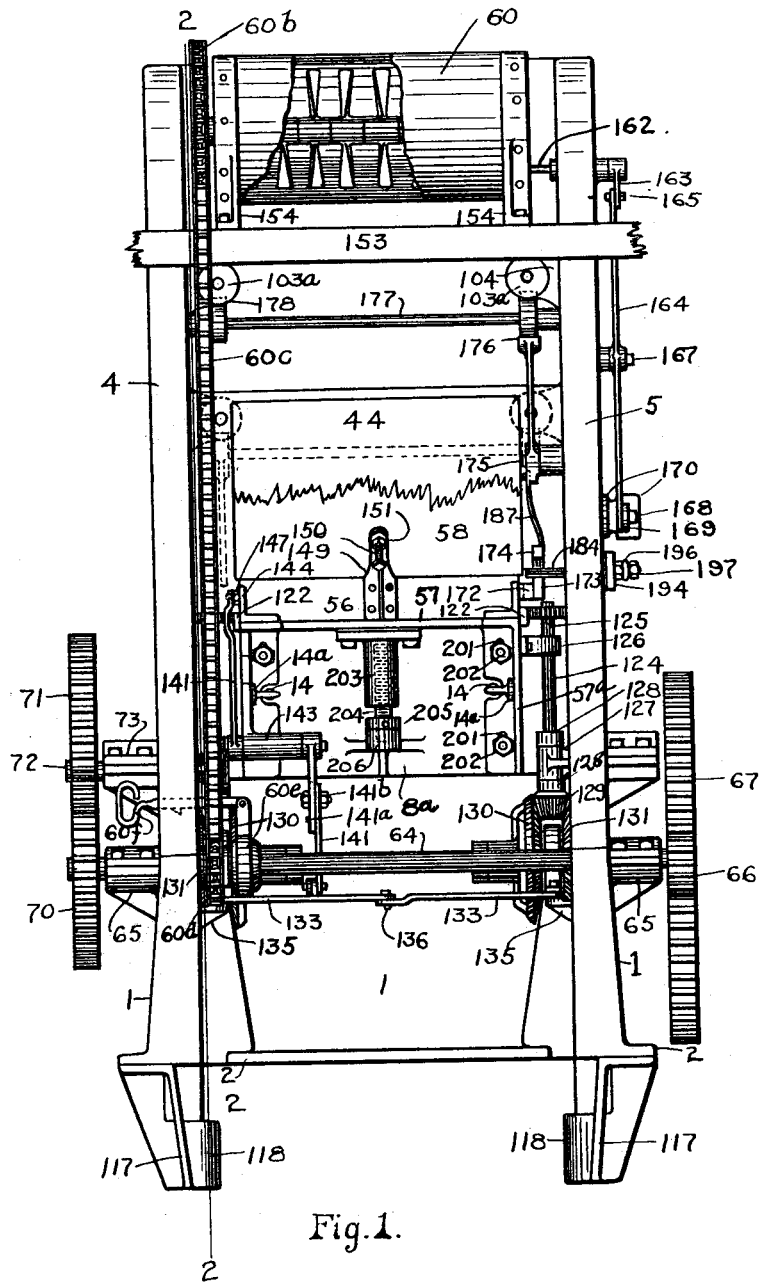
Figure 2:
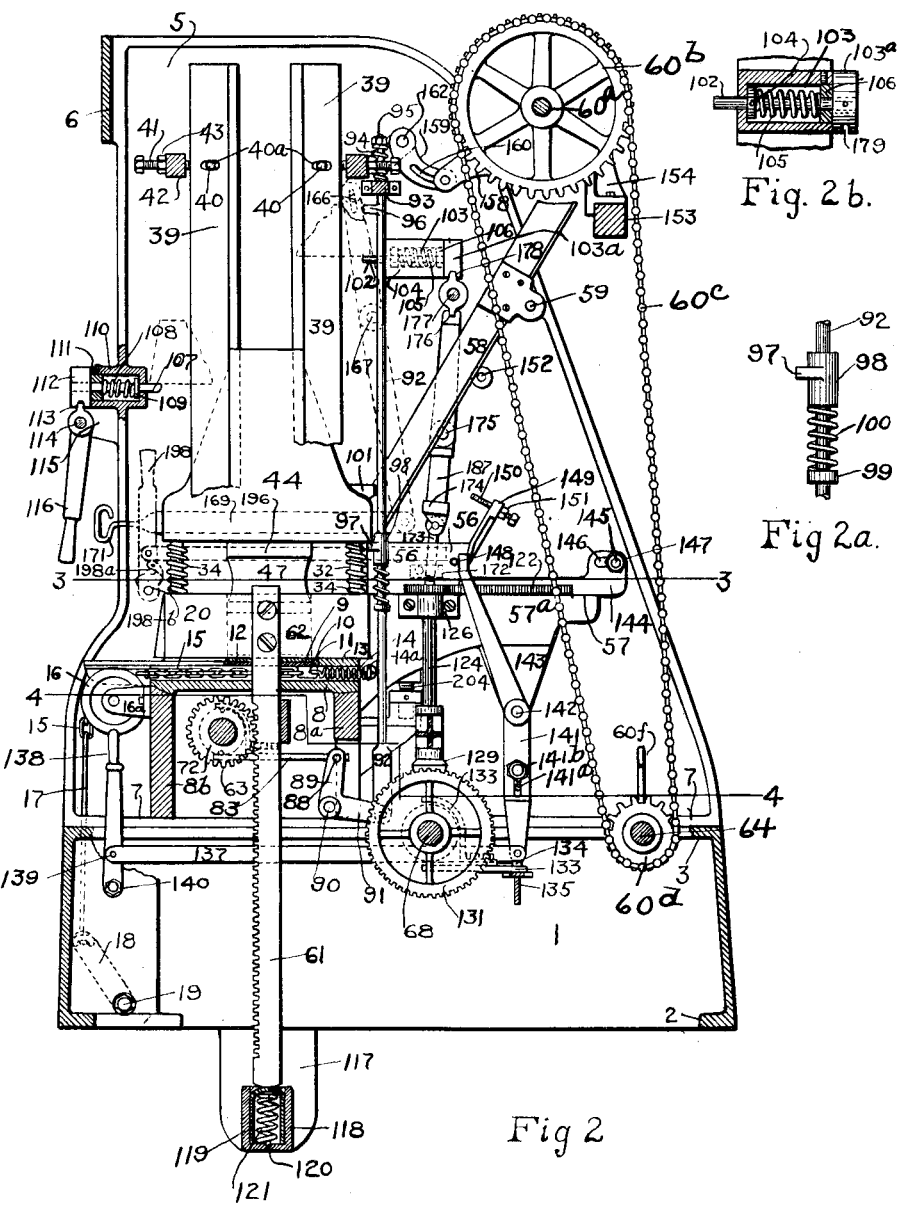
Figures 3, 4:
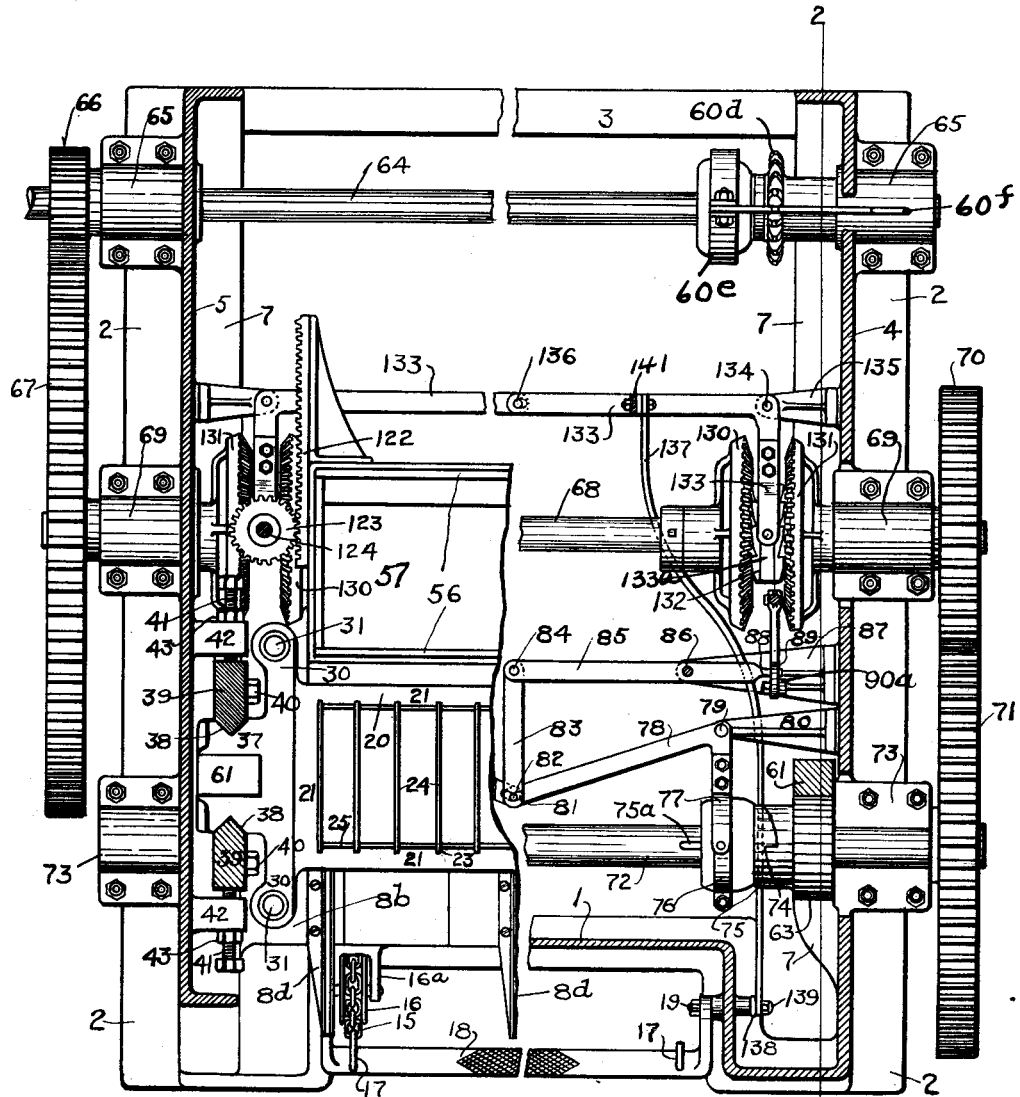
Figure 5:
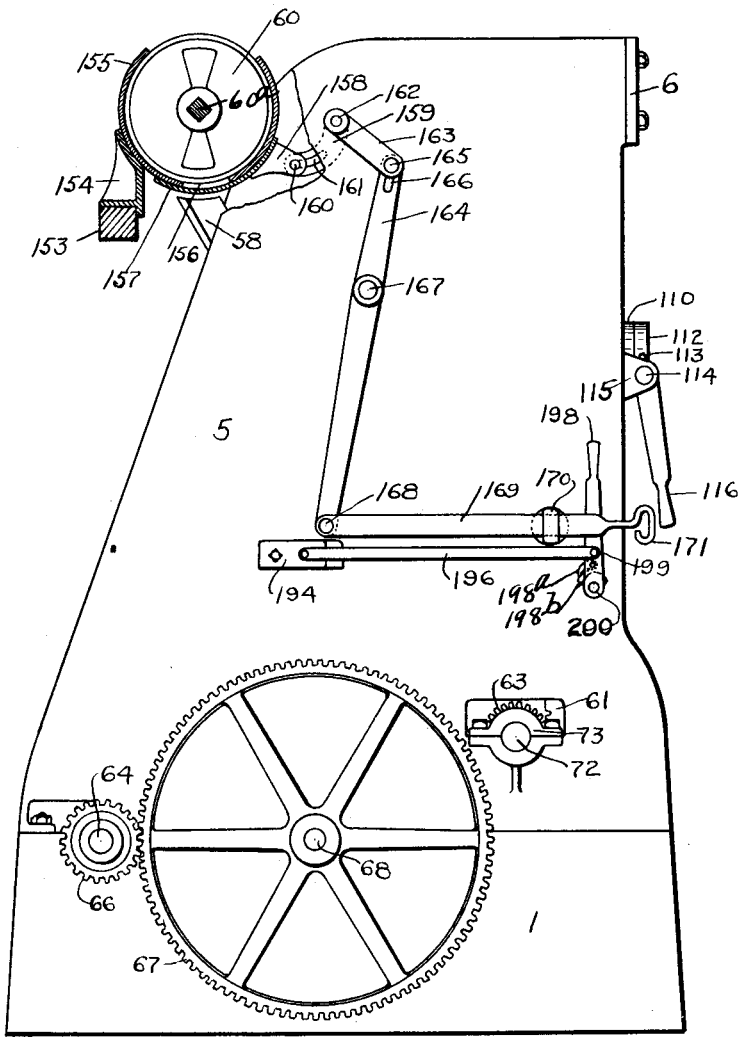

In the accompanying drawings the invention is illustrated as follows:

Figure 1 is a rear elevation of the machine. Fig. 2 is a section on the line 2—2 in Figs. 1 and 4. Fig. 2ª shows a latch for tripping the clutch lifting the plunger and mold. Fig. 2ᵇ is a section showing the details of the construction for holding the latch in its proper position. Fig. 3 is a horizontal section of a part of the machine on the line 3—3 in Fig. 2. Fig. 4 is a horizontal section of a part of the machine on the line 4—4 in Fig. 2. Fig. 5 is a side elevation of the machine, the mixing box being broken away to better show the construction. Fig. 6 is an elevation partly in section of the plunger and dies. Fig. 7 is a front elevation partly in section of the mold and pallet. Fig. 8 is a perspective view of a fragment of the mold. Fig. 9 is a plan view of the sand box, table and platen with a pallet in place thereon. Fig. 9ª shows a section of a detail on the line 9ª—9ª in Fig. 9. Fig. 10 is an enlarged view of the pivoted finger at the end of the plunger latch tripping lever. Fig. 11 is a rear elevation of the sand box and the lower end of the plunger latch tripping lever. Fig. 12 is a side elevation of the same mechanism, with a safety mechanism for throwing out this tripping mechanism. Fig. 13 is a plan view of the same mechanism.

The general operation of the machine is as follows: A pallet is laid on the platen. The mold is lowered into position on the pallet, the pallet forming a part of the mold. A sandbox is brought forward into position over the mold, carrying with it a chute. The material is dumped into the chute, and carried to the sandbox, and delivered by the sandbox to the mold. The sandbox is then returned, the plunger is tripped, and by its weight compresses the material in the mold. The mold is automatically lifted, and after proceeding a sufficient distance, to strip the blocks from the mold, picks up the plunger, and lifts it. The pallet can then be removed, carrying with it, the formed blocks. Another pallet is put in place, and the operation is repeated.

1 marks the base of the machine. It is of box-like shape, having a flange 2 at the bottom, and a flange 3 at the top. The sides of the upper frame 4 and 5 are bolted on to this base. These sides are tied together by a cross plate 6 at the top, and have the flanges 7 extending around them. These flanges form a means as well for holding the sides to the base. The platen 8 extends across the machine, and is bolted to the cross pieces 8ª and 8ᵇ. These cross pieces not only serve as a support for the platen but also as cross beams for the frame of the machine. The ejecting slides 9 are arranged in the grooves 9ª on the platen, and have the projecting lips 10 extending through the slots 9ᵇ in the platen. These ejecting slides 9 are held against the stops 13, and returned to these stops after each operation by the springs 14, the springs being secured to the lips or ears 10 and the hooks 14ª. Chains 15 extend forwardly from the ears 10 over pulleys 16. They are connected by the rods 17 to a foot lever 18, the foot lever being pivoted on the frame at 19. The pulleys 16 are journaled between the lugs 16ª, extending from the cross pieces 8ᵇ on the frame. The slides 9 have the shoulders 11. The pallet 12 is laid on the platen, it being registered endwise by the shoulders 8ᶜ, and to the rear by the shoulders 11 acting on the stops 13. This pallet forms a part of the mold as the blocks are formed, the mold being removed from it after the material has been compressed. leaving the blocks on the pallet. The foot lever is then operated, pulling the slides 9 forward. The shoulders 11 carry the pallet 12 with the slides so that the pallet is ejected or carried to the front of the machine where it may be readily grasped and removed. The supports 8$^d$ are secured to the cross pieces 8$^b$ on a level with the platen so that the pallet may be carried forward on these supports in position to be readily grasped.

The mold 20 forms a permanent part of the machine, it is brought down on to the pallet after it is in place. It has the box or frame 21. This frame is of rectangular form, and preferably formed of an integral casting. It has the slots 22 extending from top to bottom in its opposing inner front and back faces. The projections 23 on the partition plates 24 extend into the slots 22, thus locking the partition plates against sidewise movement in the mold. The side plates 25 have notches 26 through which the projections 23 extend. The set screws 27 extend through the front and rear of the mold against the side plates 25. These set screws are arranged so that they enter the slots 22, and the edges of the set screws contact the projections 23, thus locking the partition plates against either up or down movement, the bottom set screws locking it against upward movement, and the top set screws against downward movement. The heads 28 of the set screws are arranged in the sockets 29. The partition plates and side plates are preferably slightly beveled to facilitate the entry of the plungers, and the telescopic portions of the pallet. The pallet is provided with a series of raised plates 12$^a$, which are riveted to the pallet plate. These plates 12$^a$ form telescopic joints with the partition plates 24 and side plates 25. This is of great importance in that these joints prevent the lifting of the mold by reason of the material being forced under the mold or between the mold and the pallet. The telescopic joints hold the material in the mold and prevent this tendency.

The mold is provided with the ears 30 in the corners of which are arranged spring sockets 31. Pins 32 are arranged in these sockets, these pins having the heads 33 at the top. Springs 34 are arranged on the pins between the heads 33 and the ears 30. The pins are also provided with the heads 35 which extend into the enlarged portion 36 of the sockets 31. The molds also have the projections 37 in which are the guide grooves 38. These guide grooves operate between the guides 39. The guides 39 are secured to the side frames by the screws 40, which extend from the slots 40$^a$. Adjusting screws 41 extend from the ears 42 on the frame. By loosening the screws 40, the guides 39 may be nicely adjusted by the screws 41, and the guides are then clamped by the screws 40. The screws 41 are locked into adjustment by the jam nuts 43. The plunger 44 also operates between the guides 39. It is provided with a bottom flange 46 which is supported by central web 45. The dies 47 are secured to the plunger by the bolts 48. These dies are provided with the hardened faces 49 which are provided with the screw thread sockets 50 into which the bolts 48 are screwed. The bolts extend up from the perforations 51, in the dies 46. The nuts 52 are arranged above the flange by means of which the dies are securely clamped to the plunger. The nuts 52 are locked in position by the jam nuts 53. The plunger 44 is provided with the guide grooves 55 in the projections 54. These guide grooves operate on the guides 39.

The sandbox 56 is of rectangular shape, and open at the bottom and top. The front side of the sandbox, as it is passed over the mold, levels the material in the mold and scrapes off whatever surplus there may be. The sandbox rests on a table 57. The mechanism for operating the sandbox will be hereinafter described. The chute 58 swings on the pins 59 secured to the side frames. It is carried forward with the sandbox and returns with it. The material is dumped into the chute from the mixer 60 which is arranged at the top of the machine.

The details of the operating mechanisms are as follows: The racks 61 are secured to the sides of the mold by means of the screws 62. The racks mesh with the gears 63. The machine, as a whole is driven from the shaft 64. This shaft is journaled in the bearings 65, mounted on the side frames. The gear 66 is fixed on the shaft 64, and drives a gear 67. The gear 67 is fixed on the shaft 68. The shaft 68 is mounted in the bearings 69 on the side frames. A gear 70 is fixed on the shaft 68, and drives a gear 71. The gear 71 is fixed on the shaft 72 and drives this shaft. The shaft 72 is journaled in the bearings 73 mounted on the side frames.

The gears 63 are normally loose on the shaft 72 but when locked with the shaft they move in unison so that the racks 61 at the opposite sides of the machines are driven together, forming in effect a paralleling device which maintains the mold box in a horizontal position as it is lifted. Detents 74 are arranged on the gears 63, and form one element of a clutch,—the other element, having the detent 75. The strap 76 is secured to the detent 75 in the usual manner, and the detent 75 is driven by the shafts 72 through a spline and groove connection, the spline and groove connection being shown at 75$^a$. The throat 77 of the bell crank lever 78 is pivotally secured to the strap 76. The bell crank lever is pivotally mounted at 79 on the bracket 80, extending from the side frame. There are, of course, two of these levers, one at each side of the machine. They are slotted at 81. A pin 82 is mounted on the link 83 and extends through the slots 81. The link 83 is pivotally secured on the lever 85 by the pin 84. The lever 85 is pivotally mounted at 86 on the bracket 87, the bracket extending from the side frame. The lever 85 has a reduced or rounded end 88 which extends through a bell crank lever 89. The bell crank lever 89 is mounted on a pin 90, and the pin extends into an ear 90ª on the bracket 87. The opposite arm 91 of the bell crank lever, from that into which the lever 85 extends, is pivotally connected with a rod 92, which extends upwardly through a guide 93 near the top of the machine. The weight of the rod is balanced by a spring 94 which is arranged on the rod between the guide 93 and the nut 95 on the end of the rod. The rod is provided with a trip finger 96 at the top, and the trip finger 97 at the bottom of the travel of the plunger and in the path of the plunger. The trip finger 97 is mounted on a sleeve 98, slidingly mounted on the rod 92. A spring 100 is arranged on the rod 92, and rests on a shoulder 99 fixed on the rod 92. The plunger 44 has a finger 101, which extends into the path of the trip finger 96 at the top of the rod 92.

The operation of the plunger and the mold raising apparatus is as follows: As the plunger is tripped and descends, it contacts the trip finger 97 crowding the sleeve 98 downwardly, thus forcing the detent 75 into engagement with the detent 74. The movement of the several levers above described can be readily followed. The purpose of the sliding sleeve and spring is to permit of the plunger moving into its final lower position, and the clutch is then thrown in through the action of the spring 100. As soon as the clutch is thrown in, the gears 63 take the motion of the shaft 72, and operate upon the racks 61, lifting the mold 20. As the mold continues to rise, it picks up the plunger 44, and these are lifted together until the finger 101 of the plunger contacts the trip hammer 96 on the rod 92. This moves the rod upwardly, and throws the clutch, formed by the elements 74 and 75, out of engagement. The plunger is locked in its upper position by a spring latch 102, the latch 102 extending through a box 103. It has a head 103ª at its opposite end, and the shoulder 104 fixed on the latch in the box. A spring 105 is arranged and tensioned against the shoulder 104, and the wall 106 of the box. The beveled edge of the plunger contacts the latch and forces it back and as the plunger reaches a point above the latch, the latch slides in under the plunger, locking it in its upper position. After the clutch is thrown out the mold box is stripped from the plunger through the action of the springs 34, and would be free to descend except that it may be caught by latch 107. Latch 107 extends through pocket 110 in the frame. It has a shoulder 109 in the pocket. A spring 108 is tensioned against this shoulder and the wall 111 of the pocket. The latch has the shoulder 112 at its outer end which is engaged by locking the finger 113. The finger 113 is mounted on the shaft 114. A lever 116 is fixed on the shaft 114 for throwing the locking fingers 113, it being understood that there are two of the latches 107, one at each side of the machine. The shaft 114 is mounted on the lugs 115, extending from the side arms. In the normal operation of the machine, this latch 107 may be thrown out of operation if the operator is rapid enough to remove one pallet and insert another during the ascending and descending movement of the mold. Where the circumstances are such that this can not be done with sufficient rapidity to accomplish this purpose, the latch 107 may be used.

When the mold is released from the latch 107, it descends by gravity onto the pallet, the plates 12ª telescoping the mold forms. To break the shock of the movement of the mold, dash pots are arranged at the bottom of racks 61. These dash pots are arranged in the lugs 117 which extend inwardly from the base. The dash pot has the case 118 and the plunger 119 fits in the case, and a small leak 120 is provided. A spring 121 lifts the plunger 119 as the mold is raised.

The sand box is actuated by the following mechanism. The racks 122 are arranged on each side of the sand box. These racks mesh with the gears 123. The gears 123 are mounted on the shafts 124 with a spline and grooved connection 125. The shaft 124 is mounted in the bearings 126 and 127. The bearing 126 is mounted on the bracket 57ª and the bracket 57ª carries the table 57, the bearing 127 being mounted on the side frame. The collars 128 are arranged each side of the bearing 127, locking the shaft against vertical movement. The beveled gear 129 is fixed on the lower end of the shaft 124. It meshes with the beveled gears 130 and 131. These beveled gears 130 and 131 are journaled on the shaft 68. They are provided with similar directioned detents. (not shown), which are adapted to engage the detents of a clutch collar 132. A strap 133ª is arranged on the clutch 132, and the bell cranked lever 133 is pivotally secured to this strap. The lever 133 is pivotally mounted at 134 on the bracket 135. The bracket 135 extends from the side frame. It will be understood that there are two of these mechanisms, one on each side of the machine, and the levers 133 are connected together by a slot and pin 136 at the center. A rod 137 extends from the lever 133 to a lever 138 to which it is connected by a pin 139, at the front of the machine. Lever 138 swings on a pin 140, pin 140 being secured to the base of the machine. When it is desirable to move the sandbox forward, the operator moves the lever 138, swinging the clutch to engage the gear 130. This will actuate the gear 123 to move the sand box inwardly. A lever 141 is pivotally secured to the lever 133. It swings on a pin 142, the pin extending from a bracket 143. The bracket 143 is carried by the bracket 57ª. The sandbox has an extension 144. A pin 145 extends from the slot 146 on this extension and is secured in adjustment by the nut 147. When the sand box reaches the forward position, pin 145 contacts the upper end of the lever 141, thus throwing the clutch. After the charge is delivered to the mold, the operator reverses the lever 138, throwing the clutch 132 into contact with the gear 131. This moves the sand box back to its initial position. As it reaches its rear position pin 148 on the sandbox, engages the lever 141 (see Fig. 2), and throws the clutch 132 out of engagement with the gear 130.

The sandbox has an arm 149 extending upwardly from it through which extends a screw 150. This screw may be adjusted in the arm 149, and locked by the nut 151. Screw 150 contacts the chute 58 and moves it forward with the sandbox to a proper position to deliver the material to the sandbox, and as the sandbox returns to its rear position, the chute is dropped to a position resting on the stop 152. The mixer shell 155 is carried by a beam 153. A bracket 154 extends from the beam, and the mixer is mounted on this bracket. The mixer shaft 60ª is driven by the chain pulley 60ᵇ. The chain 60ᶜ runs from the chain pulley 60ᵇ to a chain pulley 60ᵈ on the shaft 64. A clutch 60ᵉ having an operating handle 60ᶠ is provided for locking the chain pulley 60ᵈ with the shaft 64 or disengaging it as action may be required. The shell 155 has the discharge opening 156 which is controlled by the shutter 157, the shutter being mounted concentrically with the shell. A bracket 158 extends from the shutter or door. It is provided with a pin 160 which extends through a slot 161 in the rock lever 159. The rock lever 159 is mounted on the shaft 162. The rock lever 163 is fixed on the shaft 162. The lever 163 is connected with the lever 164 by a pin 165 mounted on the lever 163 and extending into a slot 166 in the lever 164. The lever 164 is mounted on a pin 167 which extends from the frame side 5. The lever 164 is connected by a pin 168 with a slide 169. The slide 169 extends through the guide 170 on the side of the frame, and terminates in a handle 171 at the front of the machine. When the sandbox has reached a position under the mold, the handle 171 is pulled forward through the chain of mechanism just described, opening the door 157. The material in the mixer is discharged to the sandbox 58 and from the sandbox to the mold.

The mechanism for tripping the plunger on the return of the sandbox is as follows: A lug 172 is arranged on one side of the sand box (see Figs. 1, 11, 12 and 13). This projection contacts a trip finger 173 on the trip lever 174. The trip lever 174 is mounted on the pin 175, extending from the side frame. The upper end of the trip lever engages a lock finger 176 fixed on the shaft 177. The lock fingers 178 are also fixed on the shaft 177 and extend into the grooves 179 in the heads 103ª of the latches 102. When the sandbox returns to its rear position, the projection 172 contacts the finger 173 and swings the lever 174 so that the upper end is carried toward the front of the machine, thus operating upon the lock fingers, carrying the lock fingers 178 toward the rear, thus forcing the latch 102 from under the plunger.

In the proper operation of the machine it is desirable that the latch 102 should return prior to the next forward movement of the sandbox. It is desirable, therefore, to disengage the lever 174 from the projection 172, so as to permit of this return of the latch. This is accomplished by the mechanism shown in detail in Figs. 11, 12 and 13. The finger 173 is pivoted on the lever 174 by the pin 179. The joint involves the leaves 180 and 181, having square shoulders on the rear side, and rounded shoulders 182 and 183 on the front side, so that the finger is locked toward the rear but is free to swing toward the front of the machine. A bracket 184 is mounted on the side frame, and has a cammed surface 185, and it contacts the beveled surface 186 on the finger 173. The lever 174 has a spring 187 which permits the finger 173 to swing in the surfaces 185 and 186. The cams are so arranged with relation to the projection 172 as to force the finger 173 clear of the projection 172 prior to the completion of the required movement of the sand box, thus permitting the lever to swing under the influence of the spring 105 so that the latch 102 is in position to receive the plunger on the return of its upward movement. The frame 5 is provided with a slot 188. The faces of the side 5 adjacent to this slot are faced. The bracket 184 is provided with a plate 192 which operates upon one face of the side 5 adjacent to the slot. A distance piece 193 extends from the plate 192 through the slot and the plate 194 is secured to this distance piece by the screws 195, and operates upon the opposite face of the side 5, thus providing a mounting for the bracket, permitting it to be moved forward. The screw 189 extends through a bracket 190 extending from the side frame. By means of this screw the bracket 184 may be nicely adjusted so as to accomplish the disengagement of the finger 173 from the projection 172. Sometimes it is desirable to prevent the tripping of the plunger immediately upon the return of the sandbox. This can be accomplished with this mechanism by moving the bracket 184 forward so as to so position the cam 185 as to swing the finger 173 out of the path of the projection 172. A slide 196 is secured to one of the screws 195 by a nut 197. Slide 196 extends to the front of the machine, and is connected with a lever 198 by means of a pin 199. The lever is mounted on the pin 200, extending from the side frame. The lever carries a pawl 198ª adapted to engage the ratchet tooth 198ᵇ by means of which the lever may be locked to throw the finger out of the path of the projection, if desired. It will be noted that normally the plunger is tripped automatically by the action of the projection 172 on the lever 174.

The sand box table 57 is supported by the brackets 57ª. These are secured to the cross pieces 8ª, the brackets being provided with flanges which have the slots 201 through which bolts 202 extend. By means of these bolts the brackets are locked on the cross pieces. If it is desirable to vary the size of the bricks, the mold is changed so that a greater depth is provided, and it is then necessary to lift the table 57. To facilitate this adjustment, I provide the socket 203 on the table 57. A screw 204 extends into the socket, and it is provided with the head 205 by which it may be turned. The screw rests on the bracket 206. The spline and groove mechanism for the gear 123 permits of the movement of the gear to compensate for this movement of the table. The lever 141 is made in two parts having the slots 141ª through which extends the bolt 141ᵇ. By this means the lever may be lengthened to compensate for this adjustment of the brackets.

The operation of the machine is as follows: The pallet is placed on the plate and the mold, which has been caught by the pin 107, is released and descends to the position on the pallet. The dash pot on the lug 117 cushions the mold at the end of its movement. As soon as the mold is in place the lever 138 is actuated, thus throwing in the clutch 132. This moves the sandbox forward. At the end of the movement the clutch 132 is thrown out of action by the pin 145. The arm 149 on the sandbox carries chute 58 forward with the sandbox. When the sandbox and chute are in position the handle 171 is actuated, opening the shutter 157 and delivering a charge of material to the sandbox and mold. The lever 138 is then reversed, thus throwing the clutch 132 into engagement with the gear 130 to return the sandbox, the clutch being thrown out automatically by the pin 148. As the sandbox reaches the end of its extreme rear movement, the projection 172 engages the finger 173 on the lever 174, and this contacts the projection and releases the plunger. The plunger drops by gravity and compresses the material in the mold by its momentum. The plunger near the end of its stroke engages the finger 97, and compresses the spring 100, the spring operating on the rod 92, which, operating through the levers throws clutch into engagement with the detents 75 and 74. This operates the gear 63 and the rack 61 and starts the upward movement of the gear and mold box. The springs 34 are first compressed in this upward movement of the mold, the dies 47 and the plunger remaining stationary until the springs 34 are compressed. The dies 47, therefore, force the material through the molds. The further movement of the mold under the action of the racks and gears carries with it the plunger, and they are lifted until the finger 101 of the plunger contacts the finger 96 on the rod 92. This throws the collar 74 out of engagement with the clutch member 75. The plunger, however, prior to this has reached a position above the latch 102 and the mold takes a position above the latch 107. As soon as the clutch 74 is thrown out, the mold box is free to descend, as soon as the latch 107 is thrown out of its path. Prior to the descent of the mold box, the used pallet and the block formed upon it is removed, and a fresh pallet is inserted in its place. In removing this pallet with the forms, the foot lever 18 is operated, carrying forward the slides 9 on which the pallet rests. Shoulders 11 on these slides shove the pallet forward on the supports 8ᵈ. It will be noted that the adjustable feature of the guides 39 permits of the path of the mold boxes to be regulated to telescopically engage the pallet.

What I claim as new is:

1. In a plastic block making apparatus, the combination of a mold; a plunger operating in the mold; guides for the plunger; means for raising the plunger with the mold, and for giving the mold an initial movement in advance of the plunger to strip the mold from the material and a spring between the plunger and the mold for forcing the mold off the plunger.

2. In a plastic block making apparatus, the combination of a mold; a plunger operating in the mold; racks on the mold; gears meshing the racks; a shaft; a clutch connecting the shaft with the gears; means for automatically throwing in the clutch on the compression movement of the plunger.

3. In a plastic block making apparatus, the combination of a platen; table having registering stops; ejector slides normally resting against the rear stops, and having shoulders thereon, springs for holding said slides against such stops; means for moving said slides toward the front of the machine; a pallet on said slides, and against said shoulders; side registering stops on the platen table for the pallet; a mold registering with the pallet; and a plunger for compressing the material in the mold.

4. In a plastic block making apparatus, the combination of a mold form, having a surrounding frame open at the top and bottom having vertical grooves in the opposing faces; partition plates notched at their ends with projections at the tops and bottoms, extending into the grooves; side plates notched at the tops and bottoms through which said projections on the partition plates extend; and screws extending through the side frames, and engaging the projections on the partition plates to lock the partition plates in place.

5. In a plastic block making apparatus, the combination of a surrounding frame for a mold form, having vertical grooves in opposing faces; screw-threaded opening leading from said vertical grooves and terminating in sockets; partition plates, having notched ends with projections at the tops and bottoms, extending into the grooves; side plates notched at the tops and bottoms through which said projections on the partition plates extend; and screws in said screw-threaded opening for clamping the side plates, and engaging the projections, the heads of said screws being arranged in said sockets.

6. In a plastic block making apparatus, the combination of a mold; a plunger operating in the mold; a sandbox movable over the mold; a power driven mechanism for actuating the box comprising a shaft; two beveled gears journaled on the shaft; an intermediate beveled gear meshing both of said beveled gears; a clutch between the two beveled gears on shaft that may be thrown into engagement with either of said beveled gears for reversing the intermediate beveled gear; an actuating device between the intermediate beveled gear and the sandbox, comprising a rack on the sand box, and a gear movable with the intermediate beveled gear.

7. In a plastic block making apparatus, the combination of a mold; a plunger operating in the mold; a sandbox movable over the mold; an adjustable table supporting the sandbox; racks on the sandbox; gears meshing the racks; a shaft driving the gear and a spline and groove mechanism between the shaft and the gear.

8. In a plastic block making apparatus, the combination of a mold; a plunger operating in the mold; a sandbox movable over the mold; an adjustable table for supporting the sandbox.

9. In a plastic block making apparatus, the combination of a mold; a plunger operating in the mold; a sandbox movable over the mold; an adjustable table for supporting the sand box comprising brackets; clamping bolts for supporting the brackets; and a screw for adjusting the table.

10. In a plastic block making apparatus, the combination of a mold; a plunger operating in the mold; a sandbox movable over the mold; means for retaining the plunger in a raised position as the sandbox is moved over and from the mold; and means actuated by the movement of the sandbox for tripping the plunger as the sandbox is moved over the mold.

11. In a plastic block making apparatus, the combination of a mold; a plunger operating in the mold; a sandbox movable over the mold; means for retaining the plunger in a raised position as the sandbox is moved over and from the mold; and means for actuating the sandbox for tripping the plunger as the sandbox is moved over the mold.

12. In a plastic block making apparatus, the combination of a mold; a plunger operating in the mold; a catch for locking the plunger in its upper position; a sandbox movable over and from the mold; means for automatically tripping the catch as the sandbox is moved over the mold; and devices for disengaging the sandbox from said means to permit of the return of the catch.

13. In a plastic block making apparatus, the combination of a mold; a plunger operating in the mold; a sandbox movable over the mold; a catch for holding the plunger in an elevated position; means comprising a lever for tripping the catch; devices on the sandbox for actuating the lever; and a cam, throwing the lever out of engagement with said devices to permit of the return of the catch.

14. In a plastic block making apparatus, the combination of a mold; a plunger operating in the mold; a sandbox movable over the mold; a catch for holding the plunger in an elevated position; means comprising a lever for tripping the catch; devices on the sandbox for actuating the lever; and a cam, throwing the lever out of engagement with said devices to permit of the return of the catch; and means for adjusting the cam.

15. In a plastic block making apparatus, the combination of a mold; a plunger operating in the mold; a catch for holding the plunger in an upward position; a sandbox movable over and from the mold; a lever for moving the catch out of engagement for tripping the plunger; a finger on the lever movable in one direction, but fixed with the lever in the other direction; a projection on the box engaging the finger; and a cam for disengaging the finger from the projection.

16. In a plastic block making apparatus, the combination of a mold; a plunger operating in the mold; a catch for locking the plunger in an upper position; a sandbox movable over and from the mold; a lever for moving the catch out of engagement for tripping the plunger; a finger on the lever movable in one direction, but fixed with the lever in the other direction; a projection on the box engaging the finger; and a cam for disengaging the finger from the projection; and devices for moving the cam into position to throw the lever out of the path of said means to prevent the tripping of the plunger.

17. In a plastic block making apparatus the combination of a mold; a plunger operating in the mold; a catch for locking the plunger in an upward position; a sandbox movable over and from the mold; a lever for moving the catch out of engagement for tripping the plunger; a finger on the lever movable in one direction but fixed with the lever in the other direction; a projection on the box engaging the finger; a cam for disengaging the finger from the projection; and devices for moving the cam into position to throw the lever out of the path of said means to prevent the tripping of the plunger; and means for locking the devices in position to prevent the tripping of the plunger.

In testimony whereof, I have hereunto set my hand in the presence of two subscribing witnesses.

CHARLES W. GILL.

Witnesses:
MARGARET BEIGLE,
J. R. CRAIG.

---

Copies of this patent may be obtained for five cents each, by addressing the "Commissioner of Patents, Washington, D. C."